United States Patent [19]

Nichting

[11] Patent Number: 4,549,823

[45] Date of Patent: Oct. 29, 1985

[54] BEARING RACE RETENTION DEVICE AND METHOD

[75] Inventor: Robert P. Nichting, Peoria, Ill.

[73] Assignee: Caterpillar Tractor Co., Peoria, Ill.

[21] Appl. No.: 614,498

[22] Filed: May 29, 1984

[51] Int. Cl.$^4$ ............................................. F16C 35/07
[52] U.S. Cl. ....................................................... 384/537
[58] Field of Search .............. 308/189 R, 207 R, 236, 308/184 R; 403/225, 372; 29/149.5 R, 450, 460; 285/DIG. 26

[56] References Cited

U.S. PATENT DOCUMENTS

| | | | |
|---|---|---|---|
| 2,473,267 | 6/1949 | Wightman | 308/236 |
| 2,837,382 | 6/1958 | Schaefer | 308/236 |
| 3,053,591 | 9/1962 | Bensch et al. | 308/207 |
| 3,304,802 | 2/1967 | Kofink | 74/573 |
| 3,809,445 | 5/1974 | Hallerback | 308/184 |
| 4,128,278 | 12/1978 | Headen et al. | 308/3 A |
| 4,456,314 | 6/1984 | Messori et al. | 308/236 |

OTHER PUBLICATIONS

Sales Literature from NTN—Toyo Bearing Co. Ltd. circa 1982.

SAE Handbook—vol. 1 (pp. 11.112-11.118) on Recommended Practice SAE J120a—1984.

*Primary Examiner*—Stuart S. Levy
*Assistant Examiner*—David Werner
*Attorney, Agent, or Firm*—Charles E. LaNchantin, Jr.

[57] ABSTRACT

A bearing race retention device for a ball or roller bearing assembly mounted between a pair of relatively rotatable members is disclosed. An annular race defines a smooth notchless cylindrical surface and a preselected diametral slip fit clearance with the first member for ease of assembly, and an annular groove of uniform and generally rectangular cross section is formed in the first member and is defined generally by a cylindrical seat and first and second side walls. Advantageously, a swellable elastomeric ring of unrestrained uniform circular cross section is compressibly disposed in the groove during initial installation of the race to a mean groove fill condition of at least 65% in volume, is constrained by the side walls spaced apart about 1⅓ times the diameter of the elastomeric ring and is of a thermoset material sufficient for volumetrically swelling upon exposure thereof to a petroleum-based lubricating fluid in the clearance so that it substantially fills the groove and frictionally holds the race from rotating.

7 Claims, 2 Drawing Figures and the proper material selection of the ring to allow a preselected amount of swelling of the ring upon exposure to a petroleum-based lubricating fluid such as oil.

BEARING RACE RETENTION DEVICE AND METHOD

TECHNICAL FIELD

This invention relates generally to a bearing assembly, and more particularly to a device for holding a bearing race of the assembly from rotating with respect to an associated member.

BACKGROUND ART

It is known to mount a ball bearing assembly between the cylindrical surfaces formed by first and second members through means of a light press fit and a diametral slip fit clearance. For example, the outer race of the bearing assembly can be pressed into a cylindrical bore in a housing so that no relative motion occurs therebetween. A shaft can subsequently be manually inserted into the inner race of the bearing assembly with ease because a diametral slip fit clearance of from about 0.013 mm to 0.10 mm (0.0005" to 0.004") is provided. But this requires an auxiliary device to prevent rotation of the inner race on the shaft.

One such auxiliary restraining device requires that an upstanding lock pin be tightly fitted into a blind bore in the shaft. A recess formed in the inner race is adapted to interlockingly receive the lock pin. While this is a satisfactory and positive way to couple the parts together, it is relatively costly. The dimensions of the blind bore and locking pin must be closely controlled, and then the locking pin must be inserted with a slight interference fit into the bore with specialized tools and with care. Moreover, it takes too much effort to align the parts. Specifically, the assembler cannot simultaneously see the locking pin and the recess in the inner race of the bearing assembly so that it is necessary to radially prealign the components with extreme caution before axially assembling them together.

Resilient elastomeric ring mounts have been used to support the outer race of a ball or roller bearing assembly in a member and to allow considerable self-alignment of the components and the reduction of certain types of vibration. But these soft ring mounts are sometimes difficult to assemble and generally allow excessive radial movement and lack the degree of positive positioning that is so desirable in heavily loaded rotating mechanisms such as a vehicle transmission. In addition, many of these ring mounts are relatively expensive and often require considerable space in an area where space is at a premium.

NTN Toyo Bearing Co. Ltd. offers an expansion compensating bearing with a pair of flat polyamide bands mounted in corresponding parallel grooves formed in the periphery of the outer race of a ball bearing assembly. The coefficient of thermal expansion of the bands is relatively high so that the steel ball bearing can operate under the same interference fit conditions with respect to an aluminum housing bore at various operating temperatures. Unfortunately, the grooves in the race can weaken the structural integrity of the bearing and since it is non-standard the costs to use it are higher than desired.

Thus, what is needed is a low-cost, standard ball or roller bearing assembly race retention device for the race that has a diametral slip fit clearance without providing a recess in the race that would otherwise add cost or possibly serve to weaken the structural integrity thereof. Further, the retention device and method that prevents rotation of the race should not require radial prealignment of the parts and should be capable of axial assembly with minimal manual effort. Optimally, the subject retention device should minimize the problem of fretting between the race and associated member, and also be capable of positive operation over a considerable period of time in a power train, transmission or the like of the type that would experience an operating temperature range above about 40° C. (104° F.) and up to about 120° C. (250° F.) in the presence of oil or other petroleum-based lubricating fluid.

DISCLOSURE OF THE INVENTION

The present invention is directed to overcoming one or more of the above problems.

In one aspect of this invention there is provided a bearing race retention device for a bearing assembly mounted between first and second members and having an annular race with a smooth notchless cylindrical surface and defining a preselected diametral slip fit clearance with the cylindrical surface of the second member for ease of assembly. Advantageously, an annular groove of generally rectangular cross section is formed in the second member and is defined generally by a cylindrical seat and first and second side walls, and a swellable elastomeric ring of uniform circular cross section about its periphery is disposed in the groove which is compressed radially during installation of the race into a mean groove fill condition of at least 65% in volume prior to swelling of the ring. The side walls of the groove are spaced apart about 1⅓ times the preselected diameter of the ring and the swellable ring is of a thermoset elastomeric material sufficient for volumetrically swelling upon the exposure thereof to a petroleum-based lubricating fluid such as oil so that it substantially fills the groove upon swelling and frictionally holds the race from rotating with respect to the second member.

More specifically, the retention device of the present invention involves the proper sizing of an annular groove and a swellable ring seated within the groove, and the proper material selection of the ring to allow a preselected amount of swelling of the ring upon exposure to a petroleum-based lubricating fluid such as oil. Preferably, the swellable ring is selected from a thermoset elastomeric material group consisting of silicone rubber and ethylene propylene rubber. These materials can be adapted to have a volumetric swelling range from about 10% to about 100% and also have the ability to not be effected to any substantial degree by normal operating temperature ranges up to about 120° C. in a transmission or other drive line component. In other words, these thermoset elastomeric materials can experience minimum heat set or aging and can continually maintain frictional engagement with the race for positive retention purposes.

BEST MODE FOR CARRYING OUT THE INVENTION

Figure 1:
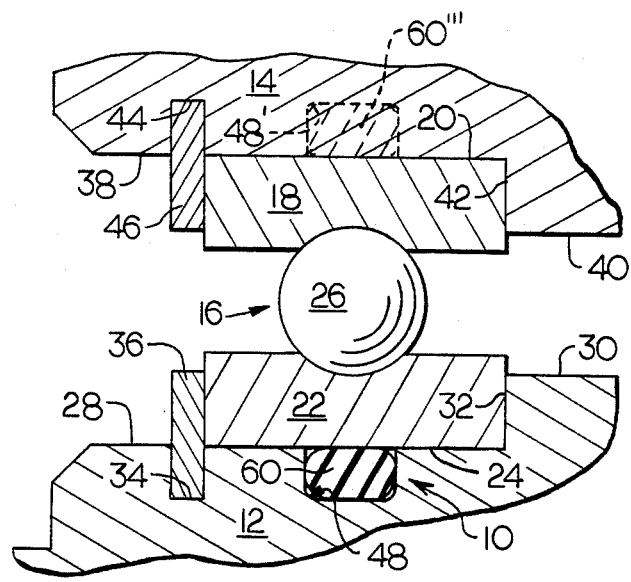
FIG. 1 is a diagrammatic, enlarged, cross sectional view of a ball bearing assembly mounted between a pair of members and incorporating the bearing race retention device of the present invention.
Figure 2:
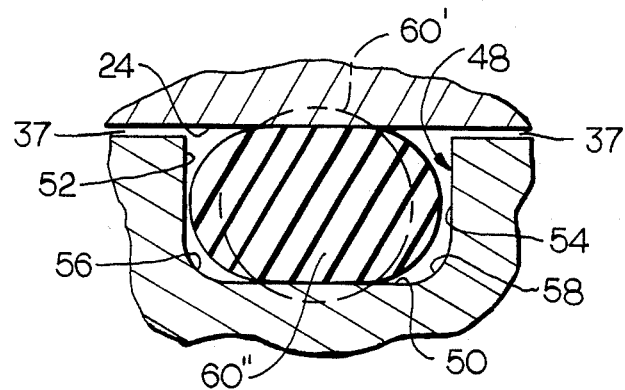
FIG. 2 is a diagrammatic and further enlarged fragmentary cross sectional view of the bearing race retention device shown in FIG. 1, illustrating the swellable elastic ring in its restrained and unrestrained conditions with respect to the groove prior to swelling thereof.

An exemplary embodiment of a bearing race retention device 10 embodying the principles of the present invention is illustrated in FIGS. 1 and 2 in conjunction with a first radially inner member or shaft 12 and a second radially outer member or housing 14. A conventional ball bearing assembly 16 has an annular outer race 18 defining a cylindrical external surface 20, an annular inner race 22 defining a smooth notchless cylindrical internal surface or bore 24, and a plurality of equally spaced ball bearings 26, one shown.

The shaft 12 has a first cylindrical external surface 28 about a central axis, not shown, and a second cylindrical external surface 30 of larger diameter defining an annular shoulder 32 therebetween. An annular recess 34 is formed in the shaft and is adapted to receive a conventional elastically deformable snap ring 36 therein so that the inner race 22 is axially entrapped between the snap ring and the shoulder. Advantageously, the juxtaposed cylindrical surfaces 24 and 28 of the inner race and the shaft respectively are adapted to define a preselected diametral slip fit clearance 37 of about 0.013 mm to 0.10 mm as is diagrammatically illustrated in FIG. 2.

In a somewhat mirror image manner, the housing 14 has a first cylindrical internal surface or bore 38 and a second cylindrical internal surface or bore 40 of smaller diameter defining an annular shoulder 42 therebetween that is substantially axially aligned with the radially inner shoulder 32. A recess 44 formed annularly within the bore 38 receives a conventional elastically deformable snap ring 46 therein so that the outer race 18 is likewise entrapped axially between the snap ring 46 and the shoulder 42. The juxtaposed cylindrical surfaces 20 and 38 of the outer race and the housing respectively are adapted to define a preselected diametral press fit or light interference fit as is conventional in the art.

More specifically, the bearing race retention device 10 includes an annular groove 48 of uniform and substantially rectangular cross section formed in the first member or shaft 12 concentrically about the central axis thereof. As best shown in FIG. 2, the groove is preferably of preselected construction as defined by a cylindrical inner seat or wall 50, first and second side walls 52,54 substantially perpendicular to the inner seat, and first and second arcuately blending transition or corner portions 56,58.

A swellable elastomeric ring 60 of uniform circular cross section about its periphery is disposed in use in the annular groove 48, and prior to its installation it has a circular cross section of a preselected diameter as shown in phantom in FIG. 2 and as identified by the reference number 60'. Preferably, ring 60' has an inside diameter that is smaller than the diameter of the inner seat 50 so that when initially installed in the groove a diametral stetch of 2 to 4% will exist.

The swellable elastomeric ring 60' has an outside diameter that is greater than the inside diameter of cylindrical surface 24 of the inner race 22, so that when the inner race is axially installed the ring is preferably subjected to a diametral compression of at least 15%. In such initially compressed state of the ring as is shown in FIG. 2 by the solid lines and by the reference number 60'', it is contemplated that a mean groove fill condition of at least 65% in volume will exist.

In addition to the abovementioned structural relationships between the swellable elastomeric ring 60 and the annular groove 48, the ring is of a preselected thermoset elastomeric material sufficient for a significant amount of unrestrained volumetric swelling in response to exposure of the ring to a petroleum-based lubricating fluid such as oil. Accordingly, in use and upon swelling, the ring substantially fills the groove and functionally holds the inner race 22 from rotating on the shaft 12.

Preferably, the thermoset elastomeric material of the swellable ring 60 is selected from the group consisting of silicone rubber and ethylene propylene rubber such as ethylene propylene terpolymer or EPDM rubber.

INDUSTRIAL APPLICABILITY

In operation the outer race 18 of the ball bearing assembly 16 is pressed into the bore 38 of the housing 14 with a light interference fit. This assembly step can be expedited by lowering the temperature of the ball bearing assembly so that the external diameter thereof is reduced relative to the bore as is known in the art. The snap ring or retaining ring 46 is then installed to positively limit axial movement of the outer race.

The dry elastomeric ring 60 is preferably immersed in a container of a petroleum-based fluid, not shown, and stretchably installed over the cylindrical external surface 28 of the shaft 12 and positioned within the annular groove 48. Because of the diametral slip fit clearance 37 between the surfaces 24 and 28, the shaft with the ring stretchably installed over the inner seat 50 of the annular groove can then be immediately axially inserted within the inner race 22 of the ball bearing assembly 16. This compresses the outer diameter of the ring and distorts its cross section from a more circular configuration to a more elliptical configuration and a mean groove fill condition of at least 65% in volume. At this point the ring has not had a chance to swell volumetrically to any significant degree.

While it has been determined that the elastomeric ring 60 does experience swelling with exposure to a petroleum-based lubricating fluid at ambient temperatures, the rate of swelling has been found to be lower than desired. However, when exposed to the same fluid at a temperature substantially above ambient the rate of volumetric growth and therefore the ability to more tightly grip the inner race 22 after a short period of time is greatly increased. In this regard the volumetric growth of an unrestrained elastomeric ring of one silicone material and one EPDM material immersed in oil at 120° C. (250° F.) for about 168 hours was about 10% and about 100% respectively. However, the groove-restricted or confined swell volume was lower, being about 8% and about 25% respectively. This phenomena is generally considered nonreversible, so that the ring would normally be replaced by a new ring if the mechanism was disassembled and rebuilt. A torque wrench was put on the inner race and measurements were taken of the torque required to slip the inner race on the gripping ring and on the shaft 12 at variously increasing time intervals. Initially, and before any significant degree of swelling, the silicone and EPDM rings exhibited gripping efforts of about 9.5 and 13.5 newton meters (about 7 and 10 lb-ft). After two hours of immersion in heated oil the same rings exhibited gripping efforts of about 19.0 and 23.0 newton meters (about 14 and 17 lb-ft). After 168 hours the rings exhibited gripping efforts of about 27.0 and 25.8 newton meters (about 20 and 19 lb-ft). Accordingly, it can be appreciated that the rate of swelling of these two materials was relatively great in the first 2 to 4 hours, and appreciably more gradual thereafter.

A neoprene ring tested under the same conditions as described above had a substantially slower rate of growth and took too long to reach an equilibrium condition after the start of the immersion test and was deemed to be less desirable. Moreover, silicone and EPDM materials have better temperature and aging resistance than neoprene.

Another test was conducted using rings of silicone and EPDM material in relatively wide grooves, that is in grooves 48 having side walls 52,54 spaced apart about two times that previously described, but the rings distorted and broke during the test. It was concluded that it is important that the side walls 52 and 54 be spaced apart about 1⅓ times the preselected diameter of the circular cross section of the swellable elastomeric ring, or from about 130% to about 140% of such diameter apart. This relationship corresponds to SAE Recommended Practice SAE J120a involving the installation of standardized rubber O-rings in standardized grooves for automotive sealing applications.

A number of the bearing race retention devices 10 of the present invention have been experimentally evaluated in the power shift transmissions of earthmoving equipment with very satisfactory results. While those devices tested were effective to grip the inner race 22 of the ball bearing assembly 16, it is contemplated that the same principles can be applied to the outer race 18. As shown by the broken lines in FIG. 1, an annular groove 48' can open radially inwardly on the cylindrical bore 38 and a swellable elastomeric ring 60''' installed therein in much the same manner as described above with respect to the ring 60. In such case the diametral slip fit clearance 37 would be provided between the juxtaposed cylindrical surfaces 20 and 38, and the press fit would be used to positively connect the inner bearing race 22 to the shaft 12 without the ring 60 being needed.

In view of the above, it is apparent that the bearing race retention device 10 is simple in construction, economical, and positive in operation and is conveniently adaptable to the assembly line of a factory.

Other aspects, objects and advantages will become apparent from a study of the specification, drawings and appended claims.

I claim:

1. A bearing race retention device for a bearing assembly mounted between a first member and a second member having a cylindrical surface, comprising:

the bearing assembly having a first race secured to the first member, a plurality of bearing elements, and a second race defining a smooth notchless cylindrical surface and a preselected diametral slip fit clearance with the cylindrical surface of the second member;

a swellable ring of unrestrained uniform circular cross section about its periphery and being of a preselected diameter; and an annular groove of generally rectangular cross section concentrically formed in the second member and defined generally by a cylindrical seat and first and second side walls spaced apart about 1⅓ times the preselected diameter for containment purposes, the swellable ring being disposed in the groove and being compressed radially during installation of the second race and into a mean groove fill condition of at least 65% in volume prior to swelling of the ring, the ring being of a preselected thermoset elatomeric material sufficient for volumetrically swelling upon the exposure thereof to a petroleum-based lubricating fluid, the ring being in open communication with the clearance and in response to being exposed to the lubricating fluid substantially filling the groove upon swelling and frictionally holding the second race from rotating with respect to the second member.

2. The bearing race retention device of claim 1 wherein the thermoset elastomeric material is one of silicone rubber and EPDM rubber.

3. The bearing race retention device of claim 1 wherein the first member is a radially outer member, the second member is a radially inner member, the first race is the outer race, the second race is the inner race, and the bearing elements are spherical balls.

4. The bearing race retention device of claim 3 wherein the inner member has a shoulder and retaining means for positively limiting axial movement of the inner race away from the shoulder.

5. The bearing race retention device of claim 4 wherein the outer race has a diametral interference fit in the outer member.

6. The bearing race retention device of claim 3 wherein the swellable ring has an initial diametral stretch over the seat of about 2-4%.

7. The bearing race retention device of claim 3 wherein the swellable ring is compressed radially at least 15% linearly during initial installation within the inner race.

* * * * *